(12) United States Patent
Thomassen

(10) Patent No.: US 6,285,312 B1
(45) Date of Patent: Sep. 4, 2001

(54) ARRANGEMENT FOR CONTROLLING RADAR TRANSMISSIONS FOR A SYSTEM OF ANTENNAS ON A MOVING PLATFORM

(75) Inventor: Sierk Michael Thomassen, Borne (NL)

(73) Assignee: Thales Nederland B.V., Hengelo (NL)

( * ) Notice: Subject to any disclaimer, the term of this patent is extended or adjusted under 35 U.S.C. 154(b) by 0 days.

(21) Appl. No.: 09/402,460

(22) PCT Filed: Mar. 27, 1998

(86) PCT No.: PCT/EP98/01924

§ 371 Date: Oct. 8, 1999

§ 102(e) Date: Oct. 8, 1999

(87) PCT Pub. No.: WO98/45892

PCT Pub. Date: Oct. 15, 1998

(30) Foreign Application Priority Data

Apr. 8, 1997 (NL) .................................................. 1005755

(51) Int. Cl.[7] ...................................................... G01S 13/72
(52) U.S. Cl. .............................. 342/157; 342/41; 342/67; 342/81; 342/83; 342/158; 342/372; 342/377
(58) Field of Search ............................... 342/41, 67, 74, 342/75, 77, 81, 83, 88, 89, 90, 96, 97, 157, 158, 174, 368, 371, 372, 377

(56) References Cited

U.S. PATENT DOCUMENTS

| | | | |
|---|---|---|---|
| 4,128,837 | * 12/1978 | Page | 342/67 |
| 4,649,390 | * 3/1987 | Andrews et al. | 342/140 |
| 5,627,905 | * 5/1997 | Sebok et al. | 382/107 |
| 5,825,322 | * 10/1998 | Capozoli | 342/37 |
| 5,917,442 | * 12/1999 | Manoogian | 342/62 |

OTHER PUBLICATIONS

"Target tracking in the presence of ECM: a filter design tool", Rago, C.; Mahra, R.K., System Theory, 1997, Proceedings of the Twenty–Ninth Southeastern Symposium on, 1997, pp. 514–518.*
"The problem of time in phased array radar", Billam, E.R., Radar 97 (Conf. Publ. No. 449), pp: 563–575.*
"Revisit calculation and waveform control for a multifunction radar", Watson, G.A.; Blair, W.D., Decision and Control, 1993, Proceedings of the 32nd IEEE Conference on, 1993, pp: 456–460 vol. 1.*
"Benchmark Problem For Beam Pointing Control Of Phased Array Radar Against Maneuvering Targets", Blair, W.D.; Watson, G.A.; Roffman, S.A., American Control Conference, 1994, vol. 2, pp: 2071–2075.*
"Adaptive Beam Pointing Control Of A Phased Array Radar Using An IMM Estimator", Daeipour, E.; Bar–Shalom, Y.; Li, X., American Control Conference, 1994, vol: 2, pp: 2093–2097.*

* cited by examiner

Primary Examiner—John B. Sotomayor
(74) Attorney, Agent, or Firm—Oblon, Spivak, McClelland, Maier & Neustadt, P.C.

(57) ABSTRACT

An arrangement for controlling radar transmissions for a system of antennas disposed on a moving platform. The radar transmissions are allocated to an antenna face for a future transmission. To effect an adequate allocation, a prediction arrangement is provided to predict the angular position of the moving platform and the antenna faces. Preferably an antenna is assigned that realizes the smallest off-broadside angle of the radar transmission.

24 Claims, 3 Drawing Sheets

ARRANGEMENT FOR CONTROLLING RADAR TRANSMISSIONS FOR A SYSTEM OF ANTENNAS ON A MOVING PLATFORM

BACKGROUND OF THE INVENTION

1. Field of the Invention

The invention relates to a control arrangement designed for controlling radar transmissions for a system of antennas with mutually different broadside directions, disposed on a moving platform.

The invention furthermore relates to a method for allocating a radar transmission, requested for transmission within a future time window to an antenna from a system of antennas with mutually different broadside directions, disposed on a moving platform.

2. Discussion of the Background

Control arrangements of this type are in particular used for controlling radar transmissions for systems of phased array antenna faces, which collectively constitute a multi-surface phased array antenna system. The antennas may be used for both transmitting and reception purposes. The control arrangement is generally continuously supplied with requests generated by an external request generator for realizing a radar transmission within a certain future time window.

An example of an arrangement for controlling radar transmissions for a multi-face phased array radar system is known from the European patent application EP-A-0.440.200. The control arrangement disclosed in this patent contains a number of track computers which, by means of several PRT (Pulse Repetition Time) timing computers, request the generation of transmitter pulses. These requests are supplied to a scheduler which arranges the radar transmissions in time and, per radar transmission, assigns an antenna surface.

The drawback of this prior art control arrangement is its unsatisfactory performance in case the antenna system is mounted on a moving platform, for instance on a ship, and a radar transmission is requested for transmission at a moment or time window that is so far in the future that the ship's motion come into play. In the meantime, the transmit direction of the requested radar transmission with respect to a selected antenna face may have changed in an adverse sense owing to the ship's roll, pitch and yaw, which makes it expedient to allocate the requested radar transmission to another antenna face whose position with respect to the transmit direction of the radar transmission is more favourable.

SUMMARY OF THE INVENTION

The control arrangement according to the invention obviates said drawback and is thereto characterized in that the control arrangement incorporates angle prediction means, designed to predict an angular position of a coordinate system connected to the moving platform with respect to a reference coordinate system.

The method according to the invention is thereto characterized in that during the allocation of a radar transmission to the antenna, use is made of a predicted angular position of a coordinate system connected to the moving platform with respect to a reference coordinate system.

The reference coordinate system preferably comprises the north-horizontal coordinate system so that the predicted angular position has an unambiguous reference. The coordinate system connected to the moving platform may be connected to the ship's hull or to any other object rigidly mounted to the ship, such as one of the antenna faces. As such, it constitutes a ship-fixed coordinate system.

The angular position of the ship-fixed coordinate system is preferably predicted by an adaptive prediction filter. The ship's roll, pitch and yaw have a limited frequency spectrum owing to which the corresponding angular positions are of a certain predictable nature. By making the prediction filter adaptive, it is, under changing circumstances such as a different sea state, still possible to generate an adequate prediction of the desired angles.

For allocating the requests for radar transmissions to an antenna face, the control unit can be provided with an antenna selector, connected to the prediction filter. An advantageous embodiment is then characterized in that the antenna selector is designed to select the antenna that, within the future time window and throughout the longest time span, realizes the smallest predicted off-broadside angle with the transmit direction of the radar transmission. The consequent advantage is then that the antenna gain is optimal and the side-lobe level remains low.

An alternative embodiment is characterized in that the control arrangement is designed to allocate, to each transmitting antenna, a sector within which radar transmissions may take place and that the antenna selector is designed to select a transmitting antenna if a transmit direction of the radar transmission at a future point in time falls within the sector of this transmitting antenna. The sector allocated to each transmitting antenna shall preferably be contiguous to the sector of an adjacent antenna so that on the one hand, no two antennas are receive the same radar transmission and on the other hand, radar transmission is always possible. By varying the extent of an antenna sector, it is furthermore possible to either increase or reduce the chance of a transmission being allocated to this antenna.

BRIEF DESCRIPTION OF THE DRAWINGS

The control arrangement and the method according to the invention will now be explained in greater detail with reference to the following figures, in which.

DETAILED DESCRIPTION OF THE PREFERRED EMBODIMENTS

Figure 1B:
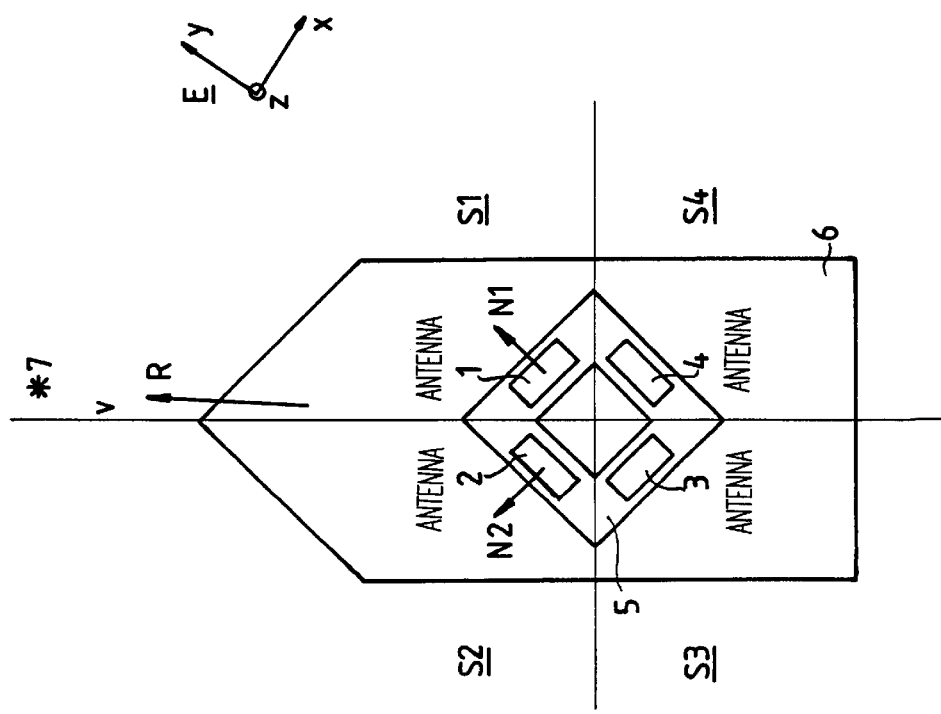
FIGS. 1A, 1B represent a ship-mounted multi-face antenna system.
Figure 1A:
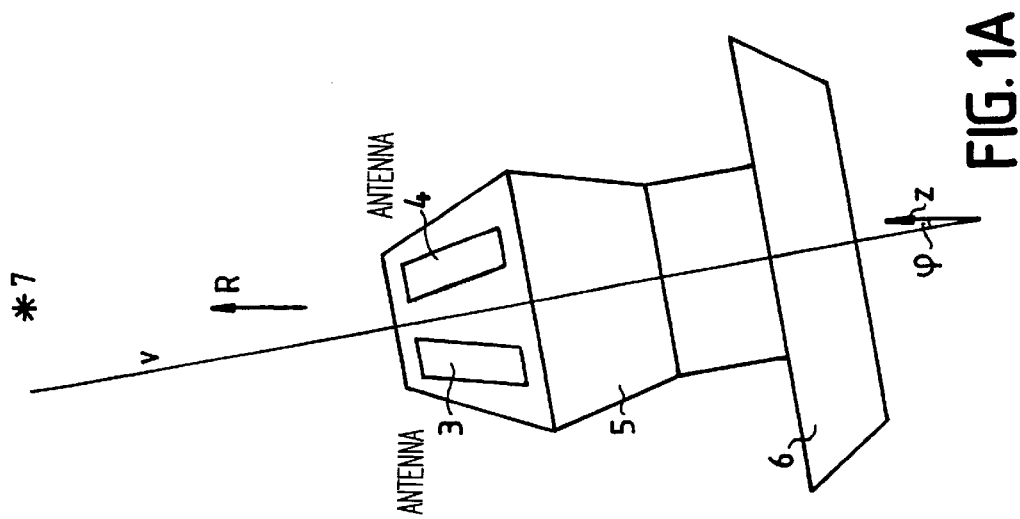

FIGS. 1A and 1B schematically represent a four-face phased array antenna system. A phased array antenna face may for instance be composed of a planar array of radiating elements, such as dipoles, slots, waveguide radiators or patches. In the example of the embodiment, each antenna face comprises an array of radiating elements, the phase of each individual element being adjustable. The four antenna faces 1, 2, 3 and 4 are disposed in a mast 5 on a ship 6 in a so-called four-face diamond configuration. Other configurations incorporating more or fewer antenna faces are also conceivable. FIG. 1B represents the antenna system in top view. The broadside directions, equal to the normal to the antenna face, are for the two front antenna faces 1 and 2 indicated by means of arrow N1 and N2. These directions show a certain elevation with respect to the ship's deck. In the example of the embodiment, the projections on the horizontal of the broadside directions of two adjacent antenna faces are at least substantially mutually perpendicular so that the four antenna faces cover the hemisphere. A radar transmission with transmit direction R with respect to a north-horizontal coordinate system E(x,y,z) is requested for transmission at a point in time $t_i$ or within a future time window, for instance for tracking a target 7. In selecting an antenna face for effecting the radar transmission, account should be taken of the off-broadside angle, i.e. the angle formed by the transmit direction with respect to the antenna face and the broadside direction of the antenna face. As this angle becomes wider, the antenna gain of phased array antennas decreases with the side-lobe level increasing. In actual practice, the applicable off-broadside angle is limited to approx. 70 degrees. In the indicated configuration, two adjacent antenna faces consequently show a 50 degree overlap within which both antennas can be selected. In order to minimize the off-broadside angle, the hemisphere can be divided into four equal sectors S1 through S4, each antenna face accounting for a sector. The figure shows that the sectors of antenna faces 1 and 2 are separated by the bisector plane V, comprising the directions whose off-broadside angles with respect to antenna faces 1 and 2 are equal.

If necessary, for instance in case of a too high antenna load, it is possible to reduce a sector allocated for that antenna face and to increase the adjacent sector correspondingly.

In the indicated situation, the ship assumes a certain attitude φ with respect to the vertical z-axis of the north-horizontal reference coordinate system E. In this case, it is best to select antenna face 1 for the indicated transmit direction. At the future point in time $t_i$, the ship may however have rolled back to the right, as a result of which the desired transmit direction with respect to the ship may divert to the other side of the bisector plane V. In this case, it is recommendable to select antenna face 2.

The prediction of the ship's angle enables an adequate selection of an antenna face. Analogously, yaw and pitch also affects the selection of the antenna face to which a future radar transmission is to be allocated.

Figure 2:
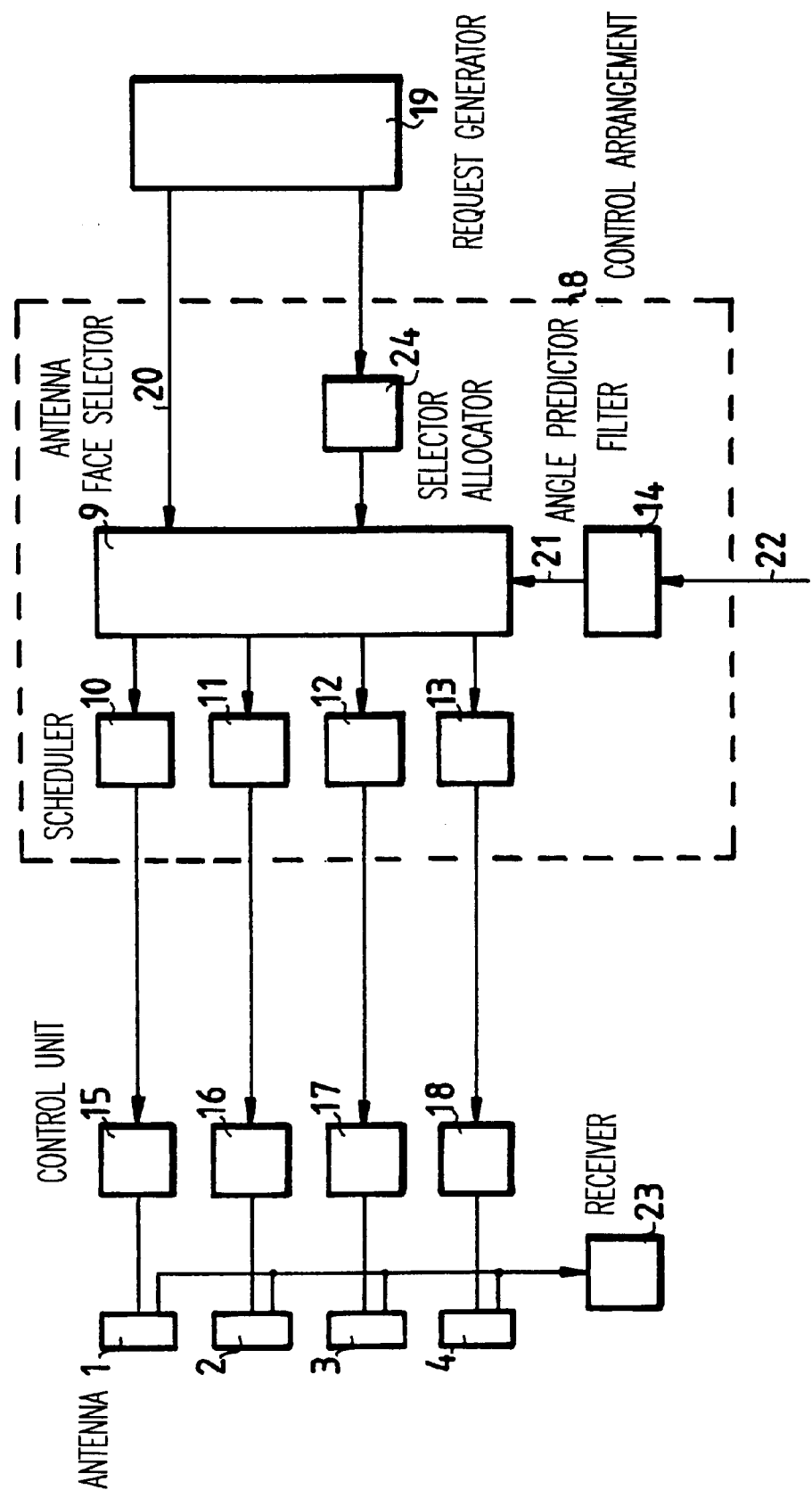
FIG. 2 represents a block diagram of a control arrangement according to the invention.

FIG. 2 represents a block diagram of the control arrangement according to the invention. The control arrangement 8 is preferably implemented as a control computer, provided with algorithms for performing the required functions. The four antenna faces shown in FIGS. 1A and 1B are numbered correspondingly in FIG. 2. The control arrangement 8 10 comprises an antenna face selector 9, a scheduler 10, 11, 12, 13 per antenna face and a ship's angle predictor 14.

Each antenna face is controlled by a control unit 15, 16, 17, 18 comprising a beam scan computer and a RF generator. The control arrangement is initiated by a request generator 19, which generates requests for radar transmissions. Furthermore, the control arrangement receives information from the predictor 14 regarding the future ship's angles with respect to the north-horizontal coordinate system E(x,y,z) or another reference coordinate system.

The working principle of the control arrangement is as follows. The request generator 19 generates, for instance at a user's request or on the basis of previous measurements performed by the multi-face antenna system, a so-called dwell request 20, i.e. a request to perform a radar transmission, also called dwell, within a certain future time window and in a certain direction with respect to the reference coordinate system. In this process, the appropriate dwell parameters are provided, e.g. the required transmit direction, the time window, transmitter frequency and pulse length. The request is routed to the antenna face selector 9, which receives the predicted ship's angles from prediction filter 14. The prediction filter 14 predicts the ship's angles at different future points in time, using the measured ship's angles 22. The predicted ship's angles are continuously stored in a cyclic memory not shown here. The selector 9 or the prediction filter 14 converts the predicted ship's angles to predicted broadside directions of all four antenna faces with respect to the reference coordinate system. To this end, use is made of information about the position of each antenna face with respect to the ship. Subsequently, the predicted off-broadside angles are computed for each antenna face. The antenna face selector 9 selects an antenna face 1, 2, 3, 4 on the basis of the desired direction of dwell 20 and the predicted off-broadside angles within the future time interval.

The dwell is then routed to a scheduler 10, 11, 12 or 13 corresponding to the selected antenna face. The scheduler arranges for the transmission of the dwell at the desired point in time $t_i$ or within the desired time window. The scheduler may give precedence to dwells that take priority over other dwells scheduled for the antenna face in question. If a dwell is to be transmitted, a control unit 15, 16, 17 or 18 is activated. Each control unit comprises a RF generator and a beam scan computer. The beam scan computer enables radar transmission in the desired direction by correctly adjusting the phases of the radiating elements, taking account of the instantaneous ship's angles. A radar transmission may be followed by a listening interval. The return signals received in this listening interval are applied to a receiver 23 and a digital processor for plot extraction and doppler processing. The relevant data may then be passed on to a track computer or request generator 19.

If necessary, a sector allocator 24 can be provided for allocating a sector to each antenna face, for instance on the basis of the load capacity of the antenna face. To this end, sector allocator 24 is controlled by request generator 19.

The prediction filter 14 may be any type of prediction filter suitable for signal processing, such as an extrapolator or an adaptive Wiener filter. The filter is preferably adaptive or learning in character, by adapting the filter parameters if the sea state and, inherently, the ship's angle spectrum assumes a different character. The prediction filter can be adapted on the basis of previously ascertained prediction errors. For instance, the filter can, continuously or at regular intervals, determine the frequency spectrum of the sea state so that the filter can be adjusted using the parameters thus obtained.

Figure 3:
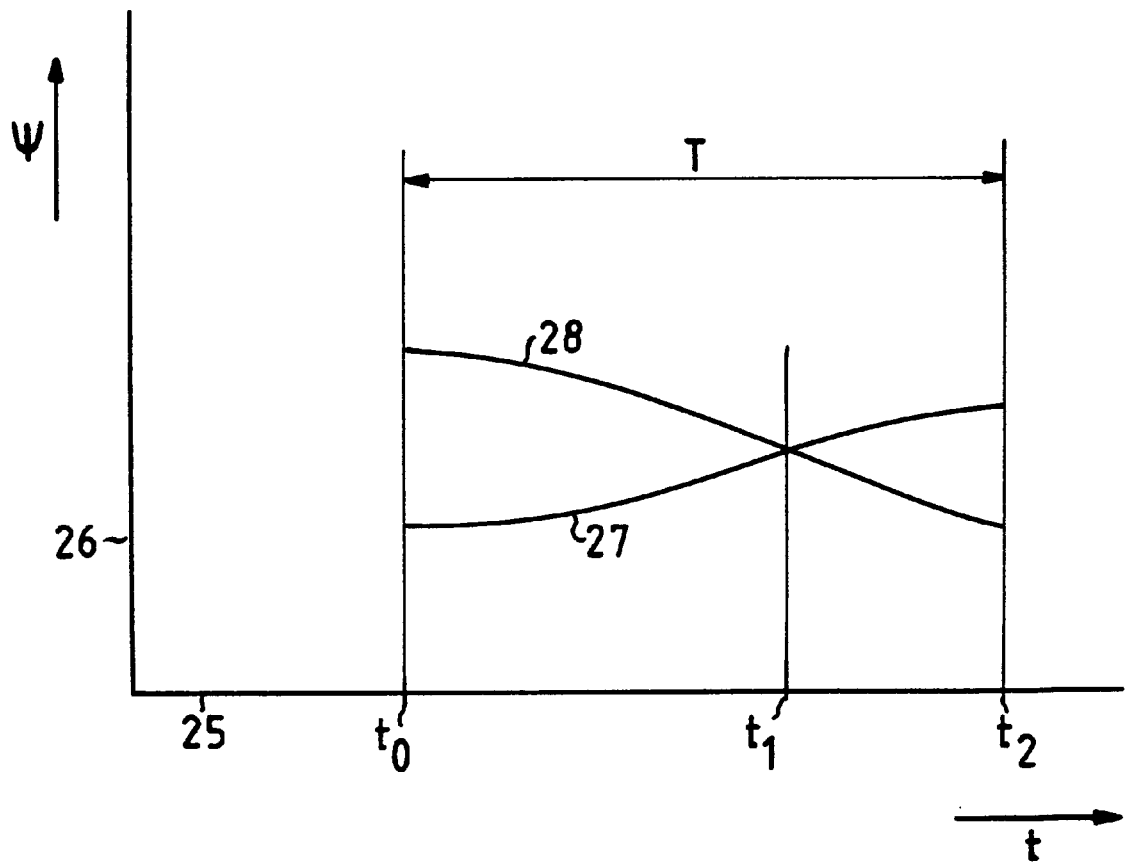
FIG. 3 is a graphic representation of the working principle of the antenna face selector.

FIG. 3 is a graphic representation of the working principle of antenna face selector 9. On the horizontal axis 25 are indicated the time t and a future time window within which a requested dwell is to be transmitted. For the two adjacent antenna faces 1 and 2, shown in FIGS. 1A and 1B, the vertical axis 26 shows the curve of predicted off-broadside angles ψ, at least within the relevant time window T. In this context it is assumed that a radar transmission is requested in a direction near the bisector plane V of the adjacent antenna faces 1 and 2. The line 27 shows the curve of the predicted off-broadside angle for antenna face 1, line 28 represents the curve for antenna face 2. In the first time interval between the points in time $t_0$ and $t_1$, antenna face 1 has the smallest off-broadside angle; in the second time interval between the points in time $t_1$ and $t_2$, antenna face 2 has the smallest angle. The antenna face selector, however, has no information at which point of time within the time window the dwell will be transmitted. The actual transmission moment is determined by the scheduler. The antenna face selector will select the antenna face that throughout the longest time span, realizes the smallest off-broadside angle. In the present case, this is antenna face 1, because the first time interval is longer than the second time interval. This way, the off-broadside angle is in case of actual transmission likely to be minimal, assuming a uniform probability distribution for transmission over the time window T.

In the ultimate case that the time window T corresponding to the requested dwell has zero length, the time window passes into a fixed future point in time $t_0=t_1=t_2$ at which the broadside angles of the various antenna faces are compared.

The example of the embodiment is based on a ship-mounted configuration. The control arrangement is, however, suitable for any other type of moving platform; the angular movements have a limited frequency spectrum.

What is claimed is:

1. A radar system for performing radar transmissions, comprising:
   at least a first antenna and a second antenna with different broadside directions and disposed on a moving platform;
   an angle predictor configured to predict an angular position of a coordinate system connected to the moving platform with respect to a reference coordinate system; and
   an antenna selector, connected to the angle predictor and configured to allocate a radar transmission requested for transmission within a future time window to one of the at least first antenna and second antenna.

2. The radar system according to claim 1, wherein the angle predictor is configured to compute predicted off-broadside angles of a transmit direction of the radar transmission with respect to the at least first antenna and second antenna within the future time window.

3. The radar system according to claim 2, wherein the antenna selector is configured to allocate the radar transmission to the one of at least first antenna and second antenna which, within the future time window and throughout the longest time span, realizes the smallest predicted off-broadside angle with the transmit direction of the radar transmission.

4. The radar system according to claim 1, further comprising:
   a scheduler for each of the first antenna and second antenna, configured to schedule the radar transmissions allocated to the at least first antenna and second antenna.

5. The radar system according to claim 2, further comprising:
   a scheduler for each of the first antenna and second antenna, configured to schedule the radar transmissions allocated to the at least first antenna and second antenna.

6. The radar system according to claim 3, further comprising:
   a scheduler for each of the first antenna and second antenna, configured to schedule the radar transmissions allocated to the at least first antenna and second antenna.

7. The radar system according to claim 1, wherein the at least first antenna and second antenna comprise a multi-face phased array antenna system.

8. The radar system according to claim 2, wherein the at least first antenna and second antenna comprise a multi-face phased array antenna system.

9. The radar system according to claim 3, wherein the at least first antenna and second antenna comprise a multi-face phased array antenna system.

10. The radar system according to claim 4, wherein the at least first antenna and second antenna comprise a multi-face phased array antenna system.

11. The radar system according to claim 5, wherein the at least first antenna and second antenna comprise a multi-face phased array antenna system.

12. The radar system according to claim 6, wherein the at least first antenna and second antenna comprise a multi-face phased array antenna system.

13. A method for allocating a radar transmission, requested for transmission within a future time window, to one antenna of a system containing at least first and second antennas with mutually different broadside directions, and disposed on a moving platform, comprising the steps of:
    predicting an angular position of a coordinate system connected to the platform with respect to a reference coordinate system; and
    allocating a radar transmission to an antenna if, within the future time window and throughout the longest time span, a transmit direction of the radar transmission realizes the smallest predicted off-broadside angle with this antenna.

14. The method according to claim 13, wherein in the predicting step the angular position of the coordinate system connected to the platform is predicted by means of an adaptive prediction filter.

15. The method according to claim 13, wherein in the allocating step a sector is allocated to each transmitting antenna and the radar transmission is allocated to the antenna if the corresponding transmission direction falls within the sector allocated to this antenna.

16. The method according to claim 14, wherein in the allocating step a sector is allocated to each transmitting antenna and the radar transmission is allocated to the antenna if the corresponding transmission direction falls within the sector allocated to this antenna.

17. The method according to claim 15, wherein the extent of the sector allocated to the antenna can be varied in accordance with the antenna load.

18. The method according to claim 16, wherein the extent of the sector allocated to the antenna can be varied in accordance with the antenna load.

19. The method according to claim 13, wherein the method is implemented on a computer system.

20. The method according to claim 14, wherein the method is implemented on a computer system.

21. The method according to claim 15, wherein the method is implemented on a computer system.

22. The method according to claim 16, wherein the method is implemented on a computer system.

23. The method according to claim 17, wherein the method is implemented on a computer system.

24. The method according to claim 18, wherein the method is implemented on a computer system.

* * * * *